July 14, 1964

J. O. REXROAD 3,141,074

ENCLOSURE HAVING AN EXTERNAL OPERATING HANDLE FOR
OPERATING AN ENCLOSED CIRCUIT INTERRUPTER

Filed Jan. 23, 1961

WITNESSES:
Bernard R. Gieguen
William A. Elchik

INVENTOR
James O. Rexroad
BY
ATTORNEY

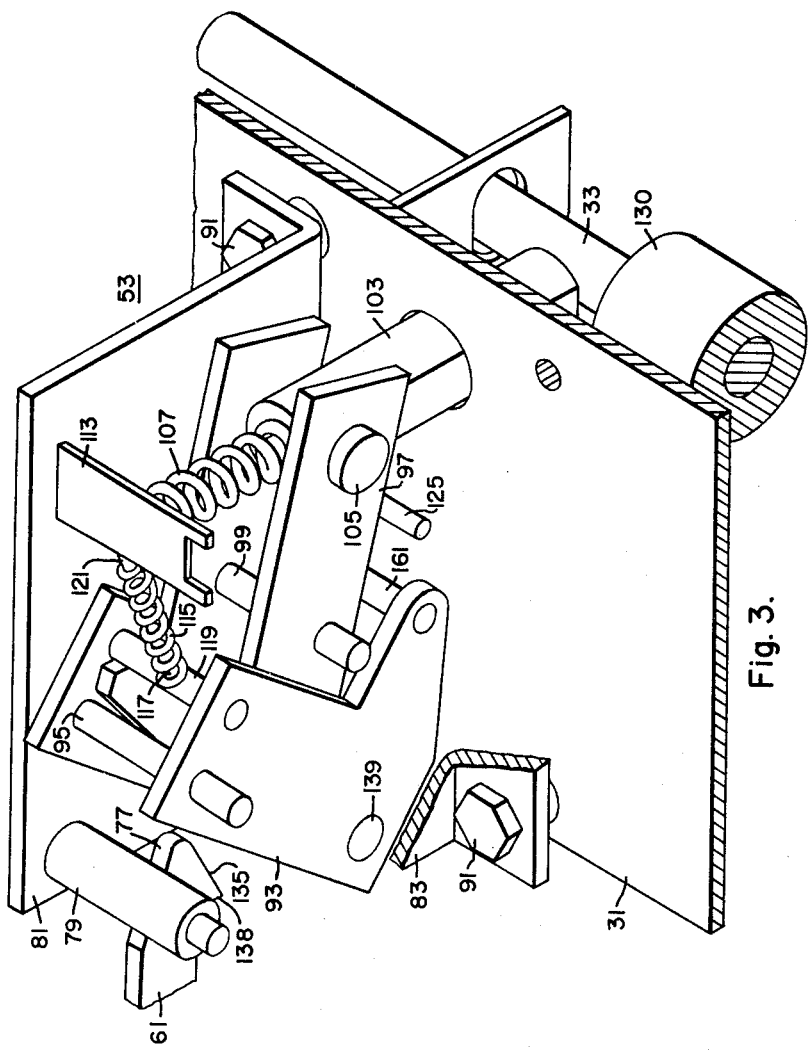

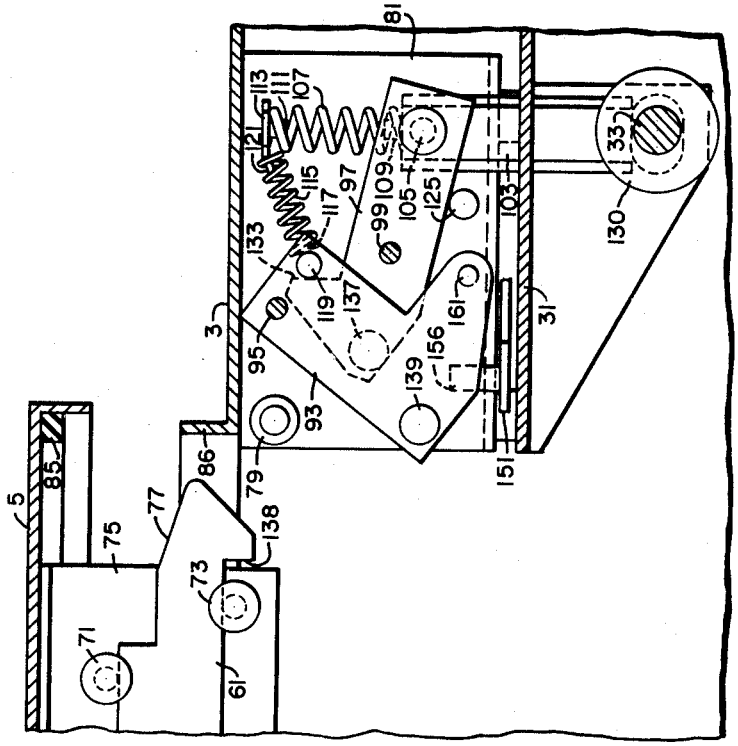
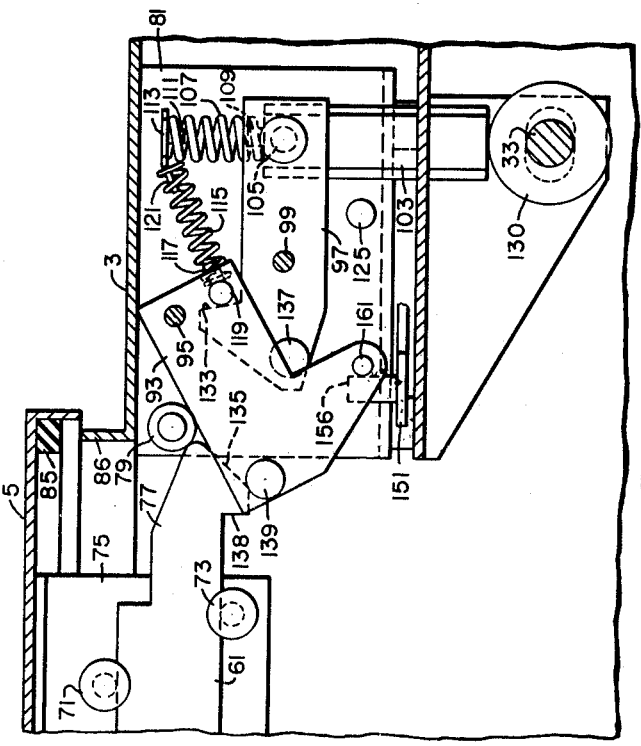
Fig. 4.
Fig. 5.

July 14, 1964    J. O. REXROAD    3,141,074
ENCLOSURE HAVING AN EXTERNAL OPERATING HANDLE FOR
OPERATING AN ENCLOSED CIRCUIT INTERRUPTER
Filed Jan. 23, 1961    6 Sheets-Sheet 5

United States Patent Office 3,141,074
Patented July 14, 1964

3,141,074
ENCLOSURE HAVING AN EXTERNAL OPERATING HANDLE FOR OPERATING AN ENCLOSED CIRCUIT INTERRUPTER
James O. Rexroad, Beaver, Pa., assignor to Westinghouse Electric Corporation, East Pittsburgh, Pa., a corporation of Pennsylvania
Filed Jan. 23, 1961, Ser. No. 83,968
9 Claims. (Cl. 200—50)

This invention relates to enclosures for circuit interrupters and more particularly to enclosures of the type having an operating handle operable from outside of the enclosure for operating a circuit interrupter mounted within the enclosure.

It is old in the art to house a circuit interrupter in an enclosure of the type having an operating handle operable from outside of the enclosure to operate the circuit interrupter. For safety reasons, this type of enclosure often includes an interlocking mechanism for latching the cover in the closed position when the circuit interrupter is closed and means for preventing closing of the circuit interrupter when the cover is open. The size of these enclosures may range from a height of one foot to ten or more feet depending on the amount of power that is to be controlled by the apparatus within the enclosure. It is an advantage, therefore, to be able to position the operating handle so that it is conveniently accessible regardless of the size of the enclosure or of the position in which the enclosure is mounted.

Accordingly, an object of the invention is to provide an improved circuit interrupter enclosure having an improved handle-operated driving mechanism which is so constructed that the handle can be disposed in a number of locations on the enclosure.

Another object of the invention is to provide an enclosure of the type described in the foregoing paragraph which enclosure includes an interlocking mechanism for latching the cover in the closed position when the circuit interrupter is closed, which interlocking mechanism also latches the driving mechanism in the open position when the cover is open.

Another object of the invention is to provide an enclosure in accordance with the preceding paragraph which enclosure includes means for defeating the interlock to permit opening of the cover when the circuit interrupter is closed.

Other objects of the invention are to provide an enclosure in accordance with each of the three foregoing objects wherein the operating handle is operatively connected to the circuit interrupter regardless of the position of the cover.

Another object of the invention is to provide a circuit interrupter enclosure having improved safety features for preventing a workman from accidentally contacting live parts within the enclosure.

Other objects of the invention will be explained fully hereinafter or will be apparent to those skilled in the art.

In accordance with one embodiment of the invention, an enclosure is provided comprising a housing structure and an openable cover mounted on the housing structure. A circuit interrupter is mounted within the housing structure and is controlled by operation of an operating handle mounted on the housing structure which handle operates a driving mechanism that is connected to the circuit interrupting operating member. The driving mechanism includes three elongated drive members operatively connected by means of two drive plates, each of which plates changes the direction of motion of the two elongated members that it connects by approximately 90 degrees. An interlocking mechanism is mounted on the housing structure and comprises a plunger that is automatically moved to latching position to prevent operative motion of the driving mechanism to thereby prevent operation of the circuit interrupter to the closed position when the cover is in the open position. The interlocking mechanism also has means provided to latch a cover latch which is mounted on the openable cover and which is moved to latching position to prevent opening of the cover. The interlocking mechanism automatically latches the cover latch in latching position to prevent opening of the cover when the circuit interrupter is in the closed circuit position. An interlock defeater is provided for defeating the interlocking mechanism to permit unlatching movement of the cover latch when the circuit interrupter is closed. With the provision of the improved driving mechanism, the operating handle can be positioned in a variety of conveniently accessible locations on the housing structure.

For a better understanding of the nature and objects of the invention, reference may be had to the following detailed description, taken in conjunction with the accompanying drawings, in which:

FIG. 3 is an isometric view, on an enlarged scale and having parts broken away, of the interlocking mechanism seen in FIGS. 1 and 2;

FIGS. 4-8 are partial sectional views showing the various operating positions of the interlocking mechanism and the parts cooperable therewith;

Figure 2:
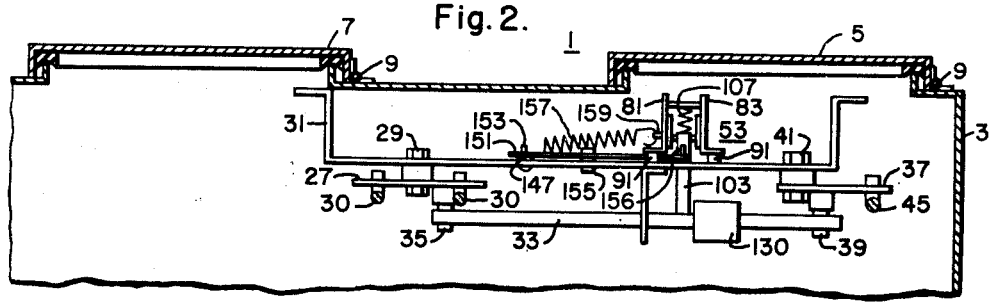
FIG. 2 is a view taken along line II—II of FIG. 1, with some parts being omitted for the purpose of clarity.
Figure 1:
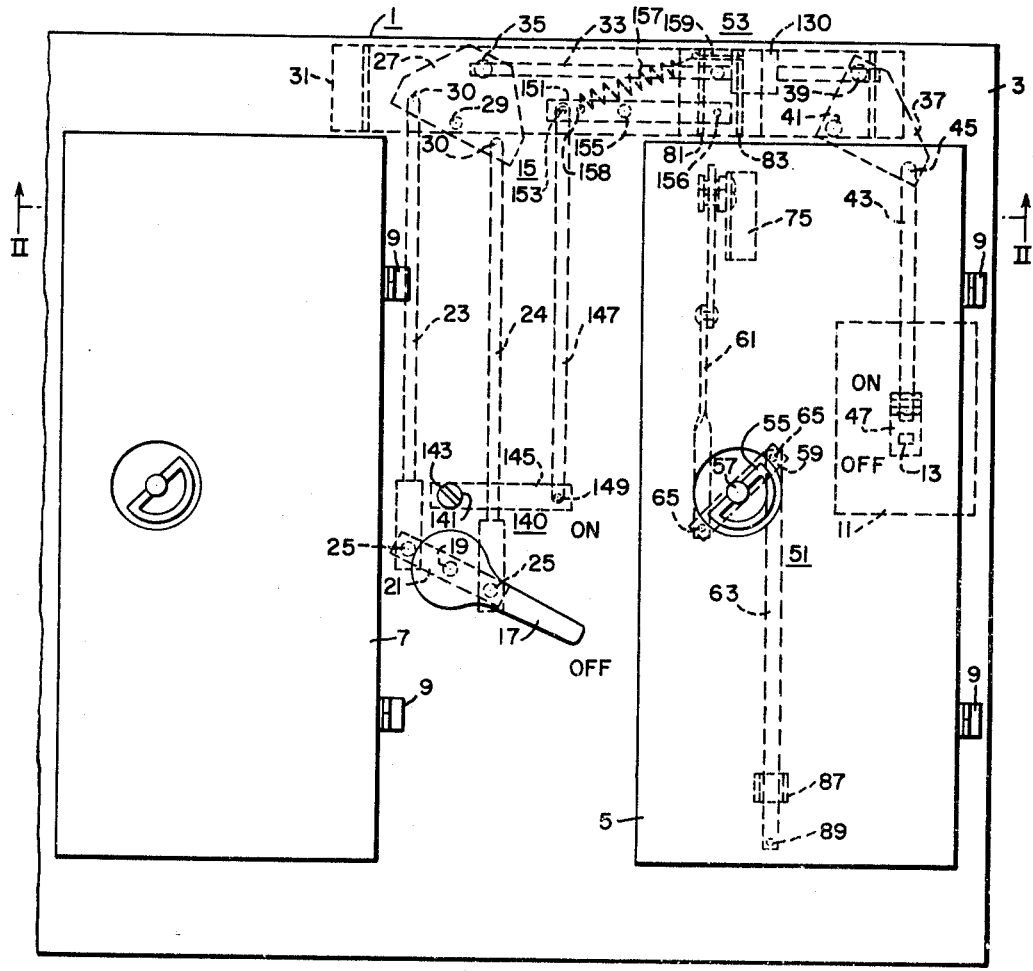
FIGURE 1 is an elevational view, with certain hidden parts in broken lines, of a circuit-interrupter enclosure embodying principles of the invention.

Referring to the drawings and particularly to FIGS. 1 and 2, there is shown therein a circuit interrupter enclosure 1 comprising a housing structure 3 having two openable covers 5 and 7 mounted thereon by means of hinges 9. A circuit interrupter 11 (FIG. 1) is suitably mounted in the housing structure 3.

The circuit interrupter 11 may be a manually operable switch or a circuit breaker of the type, for example, described in the patent to A. R. Cellerini et al., Patent No. 2,849,572, issued August 26, 1958, and assigned to the assignee of the instant application. As described in the aforesaid patent, the contact members of the circuit interrupter are opened and closed by a toggle mechanism that is actuated by an oscillating operating member 13 (FIG. 1). The operating member 13 is moved between the "on" and "off" positions by means of a driving mechanism indicated generally at 15, which mechanism is controlled by operation of a handle 17 that is disposed on the outside of the housing structure 3.

The handle 17 is rotatably supported on the housing structure 3 by means of a stub shaft 19 that extends into the interior of the housing structure 3. An elongated plate 21 is supported, intermediate its ends, at the inner end of the shaft 19. Two elongated drive rods 23 and 24 are pivotally attached to opposite ends of the plate 21 by means of pivot pins 25. The other ends of the drive rods 23, 24 are pivotally attached to a drive plate 27 on opposite sides of a supporting pivot pin 29 by having their ends bent over at 30 to extend through suitable openings in the plate 27. The pin 29 is suitably secured to a bracket 31 (FIG. 2) that is welded or otherwise suitably attached to the housing structure 3.

Another elongated drive member 33 is pivotally attached at one end to the drive plate 27 by means of a pin 35. The other end of the drive member 33 is pivotally attached to a second drive plate 37 by means of a pin 39. The drive plate 37 is pivotally attached to the bracket 31 (FIG. 2) by means of a pin 41. Another elongated drive member 43 is pivotally connected at one end to the drive plate 37 by having one end bent over at 45 to extend through a suitable opening in the plate 37. The other end of the drive member 43 is operatively connected to the operating member 13 of the circuit breaker 11 by means of a generally L-shaped bracket 47. The drive member 43 is screwed into a tapped opening in one leg of the bracket 47, and the other leg of the bracket has an opening therein that receives a part of the operating member 13.

As shown in FIG. 1, the circuit interrupter 11 is in the "off" position. In order to close the circuit interrupter 11, the handle 17 is turned counterclockwise from the "off" to the "on" position as seen in FIG. 1. This motion, by means of the drive members 23 and 24, pivots the drive plate 27 counterclockwise about the pin 29 pulling the elongated drive member 33 to the left and rotating the drive plate 37 counterclockwise about its pivot 41. This movement moves the drive member 43 upward as seen in FIG. 1 to actuate the operating member 13 from the "off" to the "on" position to thereby close the circuit interrupter 11. In order to manually open the circuit interrupter, the handle 17 is moved clockwise from the "on" to the "off" position, thereby rotating the drive plates 27 and 37 clockwise and moving the drive member 43 downward to actuate the operating member 13 from the "on" to the "off" position shown in the drawing.

The cover 5 is held in the closed position by means of a cover latch structure indicated generally at 51 that is automatically latched in latching position, when the circuit interrupter is closed, by means of an interlocking mechanism indicated generally at 53. The cover latch structure 51 comprises a cover handle 55 secured to a stub shaft 57 that has a plate 59 attached to its inner end. Two cover latches 61 and 63 are pivotally secured to the plate 59 on opposite sides of the shaft 57 by means of pins 65. The upper end of the cover latch 61 is supported between two rollers 71 and 73 (FIGS. 4–8) that are rotatably supported on a bracket 75 that is welded or otherwise suitably secured to the cover 5. When the cover 5 is closed and the handle 55 is rotated clockwise to fully close the cover 5, a cam surface 77 at the end of the cover latch 61 engages a roller 79 that is rotatably supported between two side plates 81 and 83 supported on the bracket 31 (FIG. 2) and cams the cover latch 61 and the cover 5 downward. This movement compresses a gasket 85 that is supported around the inside perimeter of the cover 5 against an upwardly extending portion 86 of the housing structure 3.

The cover latch 63 (FIG. 1) is movably supported on a bracket 87 that is attached to the cover 5. Upon closing movement of the handle 55, the free end of the cover latch 63 engages under a part of the housing structure 3 to hold the lower (FIG. 1) end of the cover 5 in the closed position. Since the cover latches 61 and 63 work in unison under the control of the cover handle 55, it is necessary to latch only one of the cover latches (in this case the cover latch 61) in the closed position to hold the cover latching structure 51 in the closed position.

The cover latch 61 is latched in the fully closed position, when the circuit interrupter 11 is closed, by means of the interlocking mechanism indicated generally at 53 in FIGS. 1 and 2, which mechanism is shown in more detail in the isometric view of FIG. 3.

Referring to FIG. 3, the interlocking mechanism 53 is supported on the bracket 31 by means of the two L-shaped side plates 81 and 83 that are secured to the bracket by bolts 91. A latch 93 that comprises two spaced identical members is pivotally supported between the side plates 81 and 83 by means of a pin 95. A plunger latch 97 that comprises two spaced identical members is pivotally supported intermediate its ends by means of a pin 99 that is supported by the side plates 81 and 83. A plunger 103 is pivotally supported at one end of the plunger latch 97 between the two identical members of the plunger latch 97 by means of a pin 105. The plunger 103 is biased downward as seen in FIG. 3 by means of a compression spring 107 that is supported at one end over a pin 109 (FIGS. 4 and 5) that is disposed at the upper end of the plunger 103, and at the other end over a pin 111 (FIGS. 4 and 5) that is secured to a spring support 113 (FIG. 3) that is stationary supported between the side plates 81 and 83. The compression spring 107 biases the plunger 103 downward as seen in FIG. 3 thereby biasing the plunger latch 97 clockwise about the pivot 99.

The latch 93 is biased in a clockwise direction about the pin 95 by means of a compression spring 115 that is supported at one end over a pin 117 that is rigidly secured to a pin 119 that is supported between the two identical members of the latch 93. The compression spring 115 is supported at the other end over a stamped out projection 121 of the stationary spring support 113. The downward movement of the plunger 103 and clockwise movement of the plunger latch 97 are limited by engagement of the plunger latch 97 with a stop pin 125 that is rigidly supported between the side plates 81 and 83. Clockwise movement of the latch 93 is limited by engagement of the latch 93 with the roller 79.

Referring to FIG. 4, the enclosure is shown with the cover 5 in the open position and the elongated drive member 33 in the position that it is in when the circuit breaker 11 (FIG. 1) is in the open or off position. With the cover 5 in the open position, the compression spring 107 biases the plunger 103 downward to the blocking position shown in FIG. 4 in which position a sleeve 130 that is rigidly secured to the intermediate drive member 33, prevents movement to the left as seen in FIG. 1, of the intermediate drive member 33, thereby preventing movement of the driving mechanism 15 to the "on" or closed circuit position. The compression spring 107 is stronger than the compression spring 115 and it overcomes the force of the spring 115 so that, as the plunger latch 97 is biased in a clockwise (FIG. 4) direction about the pin 99, a hook end 133 of the latch 97 engages the pin 119 of the latch 93 and holds the latch 93, against the bias of the compression spring 115, in the extreme counterclockwise position in which it is shown.

When the cover 5 is moved to the closed position and the cover latch structure 51 (FIG. 1) is rotated to fully close the cover as was previously described, the cover latch 61 is moved to the right (FIG. 7) and a cam surface 135 at the end of the cover latch 61 engages a pin 137 secured between the twin members of the plunger latch 97 to move the plunger latch 97 counterclockwise about its pivot 99. This movement moves the plunger 103 upward against the bias of the compression spring 107 to the unblocking position shown in FIG. 7. During this movement, the hooked portion 133 on the plunger latch 97 moves away from the pin 119 on the latch 93 permitting the compression spring 115 to move the latch 93 clockwise about the pivot 95 to the latching position in which it is shown in FIG. 7.

Figure 7:
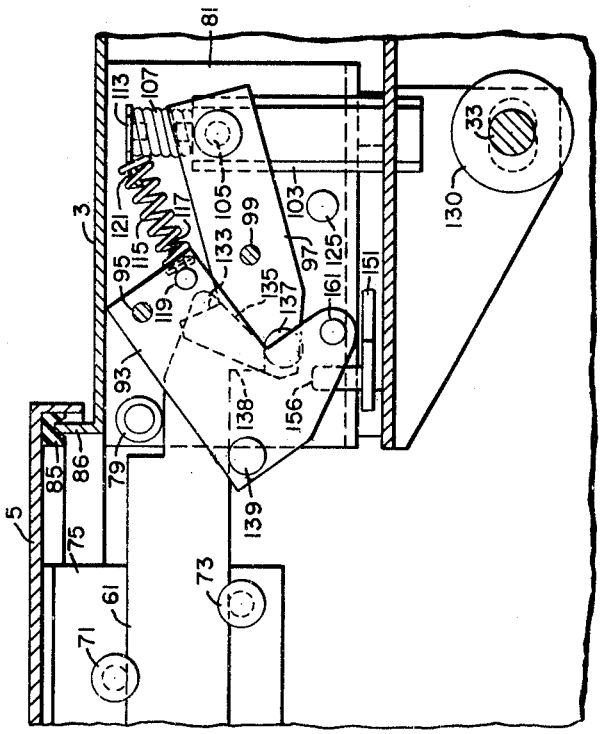

The circuit interrupter 11 and driving mechanism 15 (FIG. 1) are shown in the "open" or "off" position in FIGS. 1 and 7. When the circuit interrupter is open, the cover latch 61 can be moved freely to the left as seen in FIG. 7 to permit opening of the cover. During this movement, the cam surface 135, at the end of the cover latch 61, moves away from the plunger-latch pin 137 permitting the compression spring 107 to move the plunger 103 down to the blocking position shown in FIG. 4. During this motion, the hooked portion 133 of the plunger latch 97 engages the pin 119 on the latch 93 and moves the latch 93 in a counterclockwise direction against the bias of the compression spring 115 to the unlatching position shown in FIG. 4. With the latch 93 in the unlatching position the cover latch 61 is free to move to the left to clear the roller 79 to permit opening of the cover 5 (FIG. 4).

Figure 6:
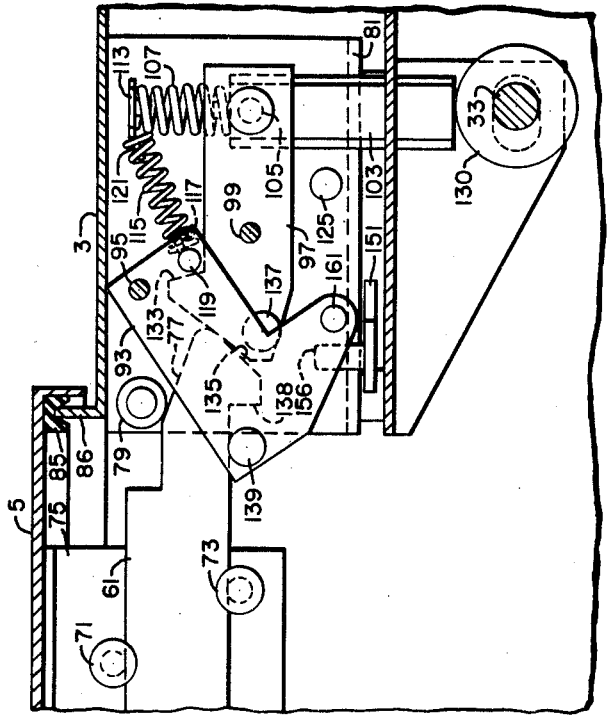

If the circuit interrupter 11 (FIG. 1) is closed when the cover 5 is in the fully closed position shown in FIG. 7, the intermediate drive member 33 (FIG. 1) and the locking sleeve 130 that is attached thereto, will be moved to the left as seen in FIG. 1 in the same manner previously described. This movement will place the locking sleeve 130 directly under the plunger 103 as is shown in FIG. 6. When the parts are in the position shown in FIG. 6, the cover 5 cannot be opened because the cover latch 61 cannot be withdrawn from under the roller 79. This unlatching movement of the cover latch 61 is prevented by engagement of a cover-latch hook portion 138 with a pin 139 that is supported between the identical side members of the latch 93. The latch 93 is held in the latching position shown in FIG. 6, under the bias of the compression spring 115, because, when the circuit interrupter is closed, the plunger 103 engages the sleeve 130 so that the plunger 103 cannot move down to move the plunger latch 97 clockwise to a position in which the hook portion 133 on the plunger latch 97 biases against the pin 119 on the latch 93 to move the latch 93 to the unlatching position, shown in FIG. 4, against bias of the compression spring 115. Thus, when the circuit interrupter is closed with the cover 5 closed, the cover 5 is automatically latched in the closed position.

As can be seen in FIG. 6, the circuit interrupter 11 (FIG. 1) would have to be moved to the open position in order to enable opening of the cover 5. This movement would then permit the plunger 103 to drop, under the bias of the compression spring 107, to the blocking position in which it is shown in FIG. 4, which movement would move the latch 93 to the unlatching position in which it is shown in FIG. 4 in the same manner previously described. Thus, after the circuit interrupter is opened, the cover latch 61 can be withdrawn from under the roller 79 to permit opening of the cover 5.

The parts are shown in FIG. 5 in the positions that they are in when the circuit interrupter 11 (FIG. 1) is "on" and the cover 5 is in the open position. (The way in which the cover 5 is opened with the circuit breaker 11 (FIG. 1) closed will be hereinafter specifically described.) Referring to FIG. 5, since the circuit interrupter is "on," the plunger 103, under the bias of the spring 107, engages the sleeve 130. If the handle 17 (FIG. 1) were moved to the "off" position to open the circuit interrupter 11, the sleeve 130 would move to the right (FIG. 1) clearing the plunger 103 (FIG. 5) whereupon the plunger would be moved downward by the spring 107 to the blocking position shown in FIG. 4 in which position, as was hereinbefore described, the sleeve 130 engages the plunger 103 to prevent closing movement of the drive member 33 to thereby prevent closing of the circuit interrupter 11. Thus, if the circuit interrupter 11 (FIG. 1) is closed when the cover is open, the circuit interrupter can be manually opened, in which case the driving mechanism 13 will be automatically latched in the open position.

Referring again to FIG. 5, the cover 5 can be closed by moving the cover handle 55 (FIG. 1) clockwise which movement moves the cover latch 61 (FIG. 5) to the right during which movement the roller 79 cams the cover latch 61 and consequently the cover 5 downward to the fully closed position. During this cover closing operation, the cam surface 135 on the cover latch 61 engages the pin 139 on the latch 93 moving the latch 93 counterclockwise about the pivot 95, against the bias of the spring 115, until the pin 139 clears the hook portion 138 of the cover latch 61, whereupon the spring 115 moves the latch 93 clockwise back to the latching position in which it is shown in FIG. 6. If the cover latch 61 is then moved to the fully closed position shown in FIG. 7, the cover latch cam surface 135 engages the plunger-latch pin 137 to move the plunger latch 97 and plunger 103 up to the unblocking position shown (FIG. 7), in the same manner hereinbefore described. With the parts in the positions shown in FIG. 7, the cover latch 61 can only be withdrawn if the circuit interrupter 11 (FIG. 1) is opened so that, as the cover latch cam surface 135 clears the plunger latch pin 137 the plunger 103 will drop down to the blocking position in which it is shown in FIG. 4 moving the latch 93 to the unlatching position shown in FIG. 4. If, however, the circuit breaker is closed, as the cover latch 61 moves from the position shown in FIG. 7 to the position shown in FIG. 6, the plunger 103 will engage the sleeve 130, and the latch 93 will remain in the latching position (FIG. 6), in which position the latch pin 139 will engage the cover latch hook portion 138 to prevent withdrawal of the cover latch 61 to thereby prevent opening of the cover 5.

Means are provided to permit an authorized workman to defeat the interlock to permit withdrawal of the cover latch 61 and opening of the cover 5 when the cover 5 is closed and the circuit interrupter 11 (FIG. 1) is in the closed or "on" position. Referring to FIG. 1, an interlock defeating mechanism indicated generally at 140 comprises an actuating member 141 having a slot 143 therein. The actuating member 141 is rotatably mounted on the housing structure 3 by means of a stub shaft that extends into the interior of the housing structure 3, which shaft has an elongated plate 145 attached to its inner end. An elongated drive member 147 is pivotally attached at one end to the plate 145 by means of a pin 149. The other end of the drive member 147 is pivotally attached at one end to the plate 145 by means of a pin 149. The other end of the drive member 147 is pivotally attached to an elongated plate 151 by means of a pin 153. The plate 151 is pivotally mounted intermediate its ends on a pin 155 that is secured to the bracket 31 (FIG. 2). An interlock release pin 156 (FIG. 1) is welded or otherwise suitably secured to the free end of the plate 151. The interlock defeating mechanism 140 is biased to the unactuated position shown in FIGS. 1–7 by means of a tension spring 157 that is secured at one end in an opening 158 in the plate 151 and at the other end in an opening at the head of a cotter pin 159 that is supported on the side plates 81 and 83.

When it is desired to open the cover 5 with the circuit interrupter 11 in the "on" or closed position, the operator inserts a screwdriver in the slot 143 and rotates the member 141 clockwise moving the plate 145 clockwise and the drive member 147 downward as seen in FIG. 1. This movement rotates the plate 151 counterclockwise against the bias of the spring 159, moving the interlock release pin 156 upward (FIG. 1) or to the right as seen in FIGS. 4–8. During this movement, the pin 156 engages a pin 161 that is rigidly supported between the twin members of the latch 93, and moves the latch 93, against the bias of the spring 115, counterclockwise about the pivot 95 to the unlatching position shown in FIG. 8. The operator must hold the member 141 (FIG. 1) in this position with one hand and with the other hand he must rotate the cover handle 55 counterclockwise (FIG. 1) to withdraw the cover latches 61 and 63 which movement is permitted because the pin 139 (FIG. 8) is now free of the hook portion 138 of the cover latch 61. When the cover latch 61 is withdrawn and the cover 5 is opened, the operator can release the member 141 (FIG. 1), whereupon the compression spring 115 (FIG. 8) will move the interlocking latch 93 back to the latching position. Upon release of the actuating member 141, the spring 159 will act to return the interlock defeating mechanism 140 back to the normal position shown in FIGS. 1–7. Since defeat of the interlocking mechanism 53 requires simultaneous operation of the member 141 and cover handle 55, it can be understood that the chances that an unauthorized person will be able to open the cover are greatly reduced.

The cover 7 shown in FIG. 1 may be a slave door that can be opened only after the cover 5 has been opened. Thus, one interlocking mechanism 53 can be used to control both of the doors 5 and 7.

Figure 8:
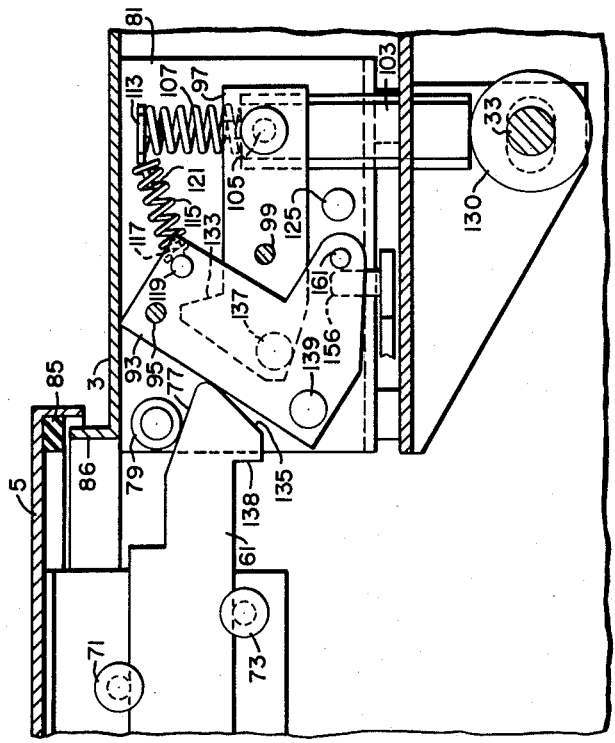
Figure 10:
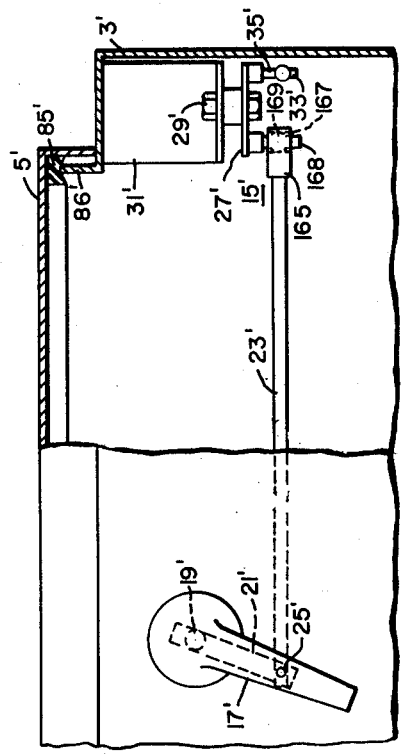
FIG. 10 is a partial side view, with parts broken away, of the enclosure seen in FIG. 9.
Figure 9:
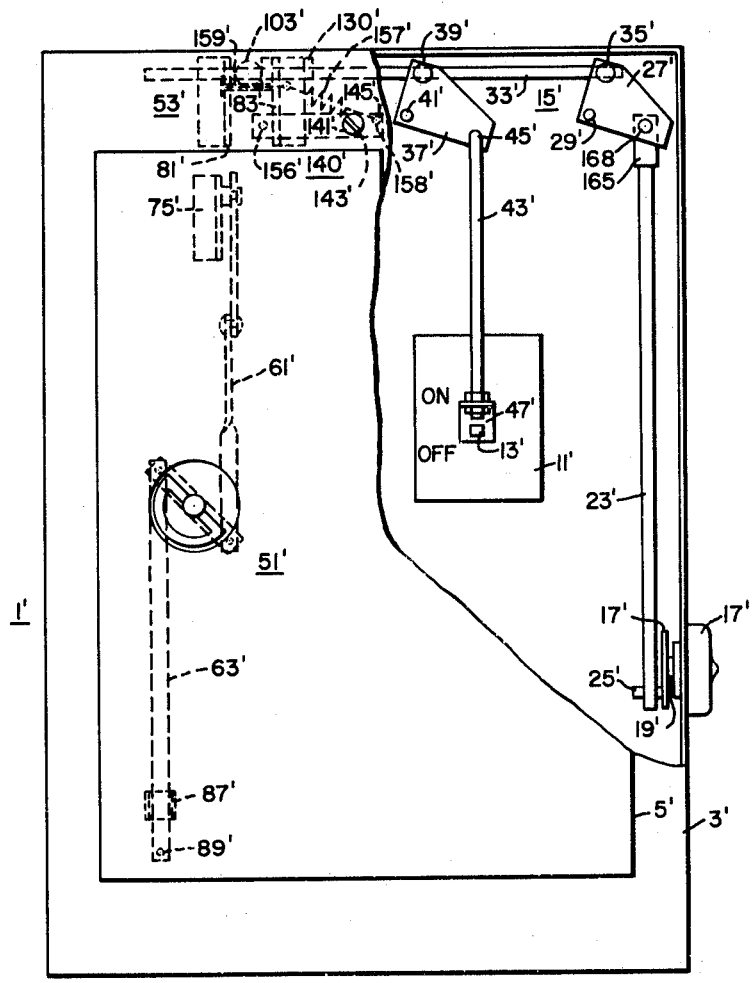
FIG. 9 is an elevational view, with parts broken away, of an enclosure illustrating a different embodiment of the invention.

A different embodiment of the invention is shown in FIGS. 9 and 10. New elements are identified by reference characters not found in FIGS. 1–8, whereas other elements which are substantially identical with, or are equivalent to, elements of FIGS. 1–8 are designated by means of prime numbers corresponding to the designations in FIGS. 1–8.

Referring to FIGS. 9 and 10, the handle 17' is shown mounted on the side of the housing structure 3' and the driving mechanism 15' comprises the drive member 23' for driving the plate 27' rather than the two drive members 23 and 24 of FIG. 1. The drive member 23' has a socket member 165 at one end having a socket 167 (FIG. 10) therein. A pin 168 pivotally connects the drive member 23' to the plate 27'. The pin 168 has a ball part 169 (FIG. 10) that fits within the socket 167 to provide a universal connection between the drive member 23' and the pin 168. This universal or ball-and-socket type connection permits a smooth operation of the driving mechanism 15' during which operation the drive member 23' not only moves longitudinally but it also pivots slightly about the pin 168. Although the parts of the driving mechanism 15' have different relative positions from the corresponding parts of the first described embodiment, the operation is substantially the same.

The circuit-interrupter 11' is shown in FIG. 9 in the open or "off" position. In order to close the interrupter 11', the handle 17' is moved from the "off" (FIG. 10) position to the "on" position moving the drive member 23' upward (FIG. 9), or to the right (FIG. 10), and rotating the drive plate 27' counterclockwise (FIG. 9) about the pivot 29'. This motion moves the drive member 33' to the left rotating the drive plate 37' counterclockwise to pull the drive member 43' upward to move the operating member 13' upward to the "on" position to close the circuit interrupter 11'. The circuit interrupter 11' can then be opened by moving the handle 17' from the "on" (FIG. 10) to the "off" position pulling the drive member 23' downward (FIG. 9), or to the left (FIG. 10), and rotating the drive plate 27' clockwise (FIG. 9). This movement moves the drive member 33' to the right rotating the drive plate 37' clockwise and moving the drive member 43' and operating member 13' downward to the "off" position to open the circuit interrupter 11'.

The operation of the interlocking mechanism 53' and cover latch structure 51' is the same as in the first embodiment except that the cover latching structure is constructed with the cover latches 61' and 63' on opposite sides of the pivot 57' from that in which they are shown in FIG. 1, so that the cover latching structure 51' is moved to the latching position by means of a counterclockwise movement of the cover handle 55' rather than the clockwise latching movement hereinbefore described with reference to the embodiment of FIG. 1.

The interlock defeating mechanism 140' is changed slightly in that the interlock release pin 156' is welded directly to the drive plate 145' so that clockwise rotation of the actuating member 141' moves the interlock release pin 156' to engage the pin 161 (FIG. 8) to move the latch 93 to the unlatching position shown in FIG. 8 in the same manner hereinbefore described.

From the foregoing description, it will be understood that applicant's improved driving mechanism 53 has increased utility in that it can be mounted in a variety of different positions on the enclosure 1. The enclosure 1 shown, for example, in FIG. 1 can vary in size from a height of about one foot to a height of about 10 feet. Regardless of the size of the enclosure 1, the handle 17 can be mounted at any convenient height on the enclosure by merely changing the length of the drive members 23, 24 and 147. The same basic driving mechanism can be used with an enclosure wherein the handle is mounted on the side of the enclosure as seen, for example, in FIGS. 9 and 10, by merely changing the position of the drive plates 27, 37 and by providing a ball-and-socket type connection between the drive member 23' and the pin 168 that pivotally connects the drive member 23' to the drive plate 27'. The handle 17' can be mounted at any height on the enclosure 1 of the embodiment shown in FIGS. 9 and 10 by merely changing the length of the drive member 23'. The handle 17 (FIG. 1) can be mounted on either side of either of the doors 5 and 7 and at any position widthwise on a housing structure 3, providing there is mounting space on the housing structure 3, by merely changing the length of the drive member 33 and the release member 151, and by moving the drive plate 27 accordingly. It can be understood that if the handle 17 were mounted at the extreme top or bottom of the housing structure 3, the drive members 23 and 24 and the drive plate 27 could be eliminated, and the plate 21 could be pivotally attached directly to the drive member 33.

If the cabinet shown in FIGS. 9 and 10 is large, the interlock defeating plate 145' can be mounted near the cover handle 55' with an appropriate driving mechanism similar to that of FIG. 1, so that simultaneous two handed operation can be performed more conveniently by a worker.

It is to be noted that in both embodiments of the invention the handle 17 or 17' is always operatively connected to the circuit interrupter 11 or 11' regardless of whether the cover 5 or 5' is in the closed or open position. This is accomplished by having the driving mechanism 15 or 15', the handle 17 or 17' and the interlocking mechanism 53 or 53' mounted on the housing structure 3 or 3' independent of the cover 5 or 5'. Thus, when the cover is in the open position, the driving and interlocking mechanisms are still operatively connected to the circuit interrupter. An advantage of this feature is that the external handle 17 or 17' can be locked in the "off" position by means (not shown; but well known in the art) of a padlock or other suitable means so that the circuit interrupter will be locked "off" regardless of the position of the cover. Another advantage is that the circuit interrupter can be operated to the open position, when the cover is open, by operating the external handle. By contrast, in the type of enclosure that comprises an external handle that disengages from the internal mechanism when the cover is opened, it is often very difficult to operate the circuit interrupting device, when the cover is open, without the mechanical lever advantages of the handle and drive mechanism. Another advantage of this feature is that the position of the external handle always gives a true visual indication of the position of the circuit interrupting device. This is an advantage over the type of enclosure that comprises an external handle that is mounted on the openable cover to engage the internal mechanism when the cover is closed. In this latter case, it is possible for the cover to be closed, or nearly closed, without proper operative engagement of the handle mechanism with the internal mechanism whereupon the position of the handle can give a false indication of the position of the circuit interrupting device.

The same interlocking mechanism 53 or 53' operates to latch the cover latch 61 or 61' in the closed position and also to latch the driving mechanism 15 or 15' in the "off" position when the cover 5 or 5' is opened. The plunger 103 or 103' and sleeve 130 or 130' are of a sturdy construction so that longitudinal operative movement of the drive member 33 or 33' can be prevented even though a worker may apply a considerable force in an attempt to move the handle 17 or 17'.

Since numerous changes may be made in the above-described construction, and different embodiments of the invention may be made without departing from the spirit and scope thereof, it is intended that all matter contained in the foregoing description or shown in the accompanying drawings shall not be interpreted in a limiting sense.

I claim as my invention:

1. In combination, an enclosure comprising a housing structure and an openable cover supported on said housing structure, a circuit interrupting device mounted within said enclosure and having an operating member movable between two operating positions to open and close said circuit interrupting device, a driving mechanism mounted on said housing structure and operatively connected to said operating member, said driving mechanism comprising two elongated drive members, means connecting said drive members together and being responsive to longitudinal movement of a first of said drive members to move the second of said drive members longitudinally in a direction generally perpendicular to the direction of longitudinal movement of said first drive member, a handle mounted externally on said housing structure, connecting means operatively connecting said handle to said driving mechanism, and said handle being movable to operate said connecting means to operate said driving mechanism to open and close said circuit interrupting device.

2. In combination, an enclosure comprising a housing structure, an openable cover supported on said housing structure, a circuit interrupting device mounted within said enclosure and having an operating member movable between two operating positions to open and close said circuit interrupting device, a driving mechanism mounted on said housing structure and comprising three elongated drive members, a handle mounted externally on said housing structure and being movable to longitudinally move a first of said drive members, means connecting said first drive member to a second of said drive members and being responsive to longitudinal movement of said first drive member to move said second drive member longitudinally in a direction generally normal to the direction of longitudinal movement of said first drive member, means connecting said second drive member to the third of said drive members and being responsive to longitudinal movement of said second drive member to move said third drive member longitudinally in a direction generally normal to the direction of longitudinal movement of said second drive member, and means operatively connecting said third drive member to said operating member.

3. In combination, an enclosure comprising a housing structure and an openable cover, a circuit interrupter mounted within said enclosure and having an operating member movable between two operating positions to open and close said interrupter, an interlocking mechanism supported on said housing structure, a cover latch supported on said cover and movable to a latching position to prevent opening of said cover, a driving mechanism supported on said housing structure and being operatively connected to said operating member, said driving mechanism comprising two elongated drive members, means connecting said elongated drive members, longitudinal movement of a first of said drive members moving said connecting means to move the second of said drive members longitudinally in a direction generally perpendicular to the direction of longitudinal movement of said first drive member, a handle supported externally on said housing structure and movable to operate said drive members to thereby operate said circuit interrupter operating member, said interlocking mechanism operating automatically to prevent closing movement of said driving mechanism when said cover is in the open position, and said interlocking mechanism operating automatically to latch said cover latch in latching position when said cover and said circuit interrupter are in the closed position.

4. In combination, an enclosure comprising a housing structure and an openable cover supported on the housing structure, a circuit interrupter mounted within said enclosure and having an operating member movable between two operating positions to open and close said interrupter, an interlocking mechanism supported on said housing structure, a cover latch supported on said cover and movable to a latching position to prevent opening of said cover, an external handle supported externally on said housing structure, a driving mechanism supported on said housing structure and operatively connecting said handle to said operating member, said driving mechanism comprising three elongated drive members, a first and a second connecting means operatively connecting said three elongated drive members, upon movement of said handle between two operating positions, said first drive members moving longitudinally to move said first connecting means to thereby move said second drive member longitudinally in a direction generally normal to the direction of longitudinal movement of said first drive member to move said second connecting means to move said third drive member longitudinally in a direction generally normal to the direction of longitudinal movement of said second drive member to thereby move said operating member from one to the other of said two operating positions, said interlocking mechanism operating automatically when said circuit interrupter and said cover are both open to prevent movement of said handle to close said circuit interrupter, and said interlocking mechanism operating automatically when said circuit interrupter is closed and said cover is closed with said cover latch in latching position to prevent unlatching movement of said cover latch to thereby prevent opening of said cover.

5. In combination, an enclosure comprising a housing structure and an openable cover supported on said housing structure, a circuit interrupter mounted within said enclosure and having an operating member movable between two operating positions to open and close said interrupter, an interlocking mechanism supported on said housing structure, a cover latch supported on said cover and movable to a latching position to prevent opening of said cover, a handle supported externally on said housing structure, a driving mechanism comprising three elongated drive members supported on said housing structure and operatively connecting said handle to said operating member, a first and a second connecting means operatively connecting said three elongated drive members, upon movement of said handle between two operating positions, a first of said drive members moving longitudinally to move said first connecting means to move a second of said drive members longitudinally in a direction generally normal to the direction of longitudinal movement of said first drive member to move said second connecting means to move the third of said drive members longitudinally in a direction generally normal to the direction of longitudinal movement of said second drive member to thereby move said operating member from one to the other of said two operating positions, a blocking member attached to said second drive member, said interlocking mechanism comprising a spring biased plunger automatically positioned in blocking position to engage said blocking member to prevent closing movement of said driving mechanism when said circuit interrupter and said cover are both open, said cover latch operating said interlocking mechanism to move said plunger to the unblocking position when said cover latch is moved to a fully closed position to thereby permit operation of said driving mechanism to thereby permit opening and closing of said circuit interrupter, said interlocking mechanism comprising a latch member for latching said cover latch in latching position, said plunger operating to move said latch member to latching position when said plunger moves to said unblocking position, and said plunger operating to move said latch member to unlatching position when said plunger moves to said blocking position.

6. In combination, an enclosure comprising a housing structure and an openable cover supported on said housing structure, a circuit interrupter mounted within said enclosure and having an operating member movable between two operating positions to open and close said circuit interrupter, an interlocking mechanism supported on said housing structure, a cover latch supported on said cover and movable to a latching position to prevent opening of said cover, a handle supported externally on said housing structure, a driving mechanism supported on said housing structure and operatively connecting said handle to said operating member, said driving mechanism comprising three elongated drive members, a first and a second connecting means connecting said three elongated drive members, upon movement of said handle between two operating positions a first of said drive members moving longitudinally to move said first connecting means to move a second of said drive members longitudinally in a direction generally normal to the longitudinal movement of said first drive member to move said second connecting means to move the third of said drive members longitudinally in a direction generally normal to the longitudinal movement of said second drive member to thereby move said operating member from one to the other of said two operating positions, a blocking member attached to said second drive member, said interlocking mechanism comprising a spring biased plunger automatically positioned in blocking position to engage said blocking member to prevent closing movement of said driving mechanism when said circuit interrupter and said cover are both open, said cover latch operating said interlocking mechanism to move said plunger to the unblocking position when said cover latch is moved to a fully closed position to thereby permit operation of said driving mechanism to open and close said circuit interrupter, said interlocking mechanism comprising a latch member for latching said cover latch in latching position, said plunger operating to move said latch member to latching position when said plunger moves to said unblocking position, said plunger operating to move said latch member to unlatching position when said plunger moves to said blocking position, and interlock defeating means manually operable from outside of said enclosure for moving said latch member to unlatching position when said plunger is in said unblocking position.

7. In combination, an enclosure comprising a housing structure and an openable cover supported on said housing structure, a circuit interrupter mounted within said enclosure and having an operating member movable between two operating positions to open and close said circuit interrupter, an interlocking mechanism supported on said housing structure, a cover latch supported on said cover and movable to a latching position to prevent opening of said cover, a handle supported externally on said housing structure, a driving mechanism supported on said housing structure and operatively connecting said handle to said operating member, said driving mechanism comprising three elongated drive members, a first and a second connecting means connecting said three elongated drive members, upon movement of said handle between two operating positions a first of said drive members moving longitudinally to move said first connecting means to move a second of said drive members longitudinally in a direction generally normal to the longitudinal movement of said first drive member to move said second connecting means to move the third of said drive members longitudinally in a direction generally normal to the longitudinal movement of said second drive member to thereby move said operating member from one to the other of said two operating positions, a blocking member attached to said second drive member, said interlocking mechanism comprising a spring biased plunger automatically positioned in blocking position to engage said blocking member to prevent closing movement of said driving mechanism when said circuit interrupter and said cover are both open, said cover latch operating said interlocking mechanism to move said plunger to unblocking position when said cover latch is moved to a fully closed position to thereby permit operation of said driving mechanism to thereby permit opening and closing of said circuit interrupter, said interlocking mechanism comprising a latch member for latching said cover latch in latching position, said plunger operating to move said latch member to latching position when said plunger moves to said unblocking position, said plunger operating to move said latch member to unlatching position when said plunger moves to said blocking position, interlock defeating means manually operable from outside of said enclosure and operable from a first position to a second position to move said latch member to unlatching position when said plunger is in said unblocking position, and means biasing said interlock defeating means to said first position whereby said interlock defeating means must be held against the force of said biasing means while said cover latch is being moved clear of said latch member.

8. In combination, an enclosure comprising a housing structure and an openable cover supported on said housing structure, a circuit interrupter mounted within said enclosure and having an operating member movable between two operating positions to open and close said interrupter, an interlocking mechanism supported on said housing structure, a cover latch supported on said cover and movable to a latching position to prevent opening of said cover, a handle supported externally on said housing structure, a driving mechanism operatively connecting said handle to said operating member, said interlocking mechanism comprising a spring biased plunger automatically positioned in a blocking position to prevent closing movement of said driving mechanism when said circuit interrupter and said cover are both open, said cover latch operating said interlocking mechanism to move said plunger to the unblocking position when said cover latch is moved to a fully closed position to thereby permit operation of said driving mechanism to thereby permit opening and closing of said circuit interrupter, said interlocking mechanism comprising a latch member for latching said cover latch in latching position, said plunger operating to move said latch member to latching position when said plunger moves to said unblocking position, and said plunger operating to move said latch member to unlatching position when said plunger moves to said blocking position.

9. In combination, an enclosure comprising a housing structure and an openable cover supported on said housing structure, a circuit interrupter mounted within said enclosure and having an operating member movable between two operating positions to open and close said interrupter, an interlocking mechanism supported on said housing structure, a cover latch supported on said cover and movable to a latching position to prevent opening of said cover, a handle supported externally on said housing structure, a driving mechanism operatively connecting said handle to said operating member, said interlocking mechanism comprising a spring biased plunger automatically positioned in a blocking position to prevent closing movement of said driving mechanism when said circuit interrupter and said cover are both open, said cover latch operating said interlocking mechanism to move said plunger to unblocking position when said cover latch is moved to a fully closed position to thereby permit operation of said driving mechanism to thereby permit opening and closing of said circuit interrupter, said interlocking mechanism comprising a latch member for latching said cover latch in latching position, said plunger operating to move said latch member to latching position when said plunger moves to said unblocking position, said plunger operating to move said latch member to unlatching position when said plunger moves to said blocking position, interlock defeating means manually operable from outside of said enclosure and operable from a first position to a second position to move said latch member to unlatching position when said plunger is in said unblocking position, and means biasing said interlock defeating means to said first position whereby said interlock defeating means must be held against the force of said biasing means while said cover latch is being moved clear of said latch member.

References Cited in the file of this patent

UNITED STATES PATENTS

| | | |
|---|---|---|
| 2,191,523 | Ellis | Feb. 27, 1940 |
| 2,321,868 | Smith | June 15, 1943 |
| 2,595,102 | Santangelo | Apr. 29, 1952 |
| 2,916,904 | Christensen | Dec. 15, 1959 |

FOREIGN PATENTS

| | | |
|---|---|---|
| 700,265 | France | Dec. 23, 1930 |
| 945,553 | France | Nov. 29, 1948 |